Patented Sept. 18, 1923.

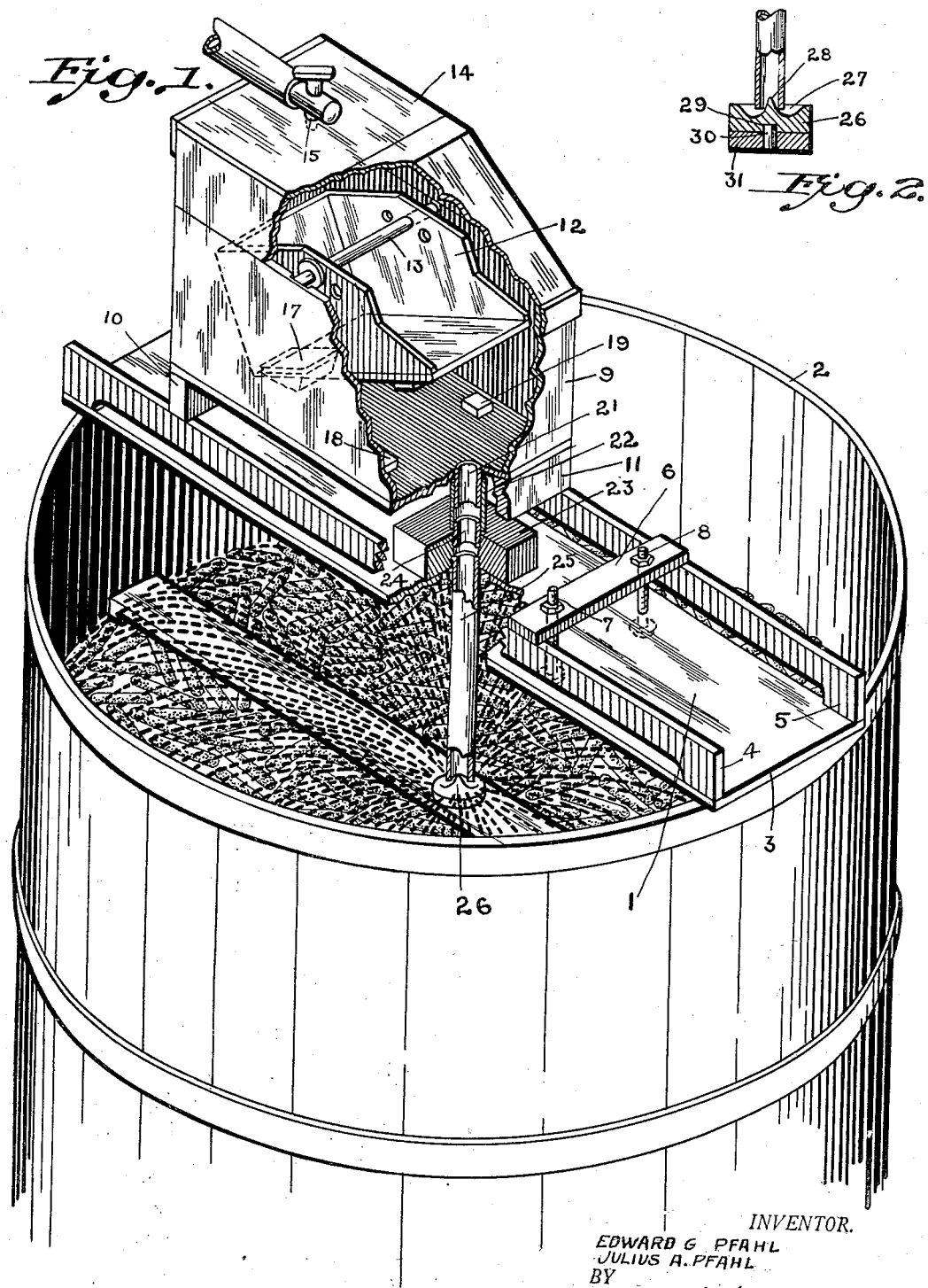
Sept. 18, 1923.
E. G. PFAHL ET AL
1,468,394
MEANS FOR FEEDING VINEGAR STOCK INTO VINEGAR GENERATOR
Filed Feb. 14, 1922
INVENTOR.
EDWARD G. PFAHL
JULIUS A. PFAHL
BY
Frank Keizer.
ATTORNEYS.

1,468,394

UNITED STATES PATENT OFFICE.

EDWARD G. PFAHL, OF ROCHESTER, AND JULIUS A. PFAHL, OF GREECE, NEW YORK.

MEANS FOR FEEDING VINEGAR STOCK INTO VINEGAR GENERATOR.

Application filed February 14, 1922. Serial No. 536,497.

*To all whom it may concern:*

Be it known that we, EDWARD G. PFAHL and JULIUS A. PFAHL, citizens of the United States, residing at Rochester and Greece, respectively, in the county of Monroe and State of New York, have invented certain new and useful Improvements in Means for Feeding Vinegar Stock into Vinegar Generators, of which the following is a specification.

The object of this invention is to provide a new and improved means whereby vinegar stock is fed into the vinegar generator.

Another object of this invention is to feed the vinegar stock into the vinegar generator in small quantities evenly, distributing the same over the whole surface of the generator filling.

These and other objects of this invention will be fully illustrated in the drawing, described in the specification and pointed out in the claims at the end thereof.

In the accompanying drawing:

Figure 1 is a perspective view of the feeding and distributing mechanism mounted on top of a vinegar generator, the parts being partly broken away to illustrate the construction and operation thereof.

Figure 2 is a detail sectional view of the spraying cup and feed pipe leading thereto by means of which the liquid is distributed over the entire surface of the generator filling.

In the figures of the drawing like reference numerals indicate like parts.

Cider vinegar is made, first, by squeezing the juice out of apples which juice is called cider. This cider is then fermented through an indefinite period that varies from about one week to as much as twelve weeks or even more, depending largely on climatic conditions. The fermented cider contains alcohol and is known as vinegar stock. Vinegar stock may be made from many other sources and the finished vinegar made therefrom will be named accordingly.

The alcohol of the vinegar stock must be turned or converted into acetic acid to make vinegar. In a barrel this conversion takes many months but by running this vinegar stock one or more times through a so-called generator the conversion can be completed in twenty-four hours.

This generator comprises a tank having a layer of coke, cobs, rattan and other suitable filling material on the bottom and a layer of straw rattan, etc., on the top thereof. The vinegar stock is distributed over these layers and is strained through them. The upper layer strains out the mother. In the process the alcohol is oxidized and becomes acetic acid and the product is known as vinegar.

In order to get the greatest efficiency out of the generator it is desirable to feed the vinegar stock into the generator in small quantities, at suitable and regular intervals while distributing the liquid evenly over the whole surface of the generator filling. In our present invention this is accomplished by means of a dumping and spraying apparatus into which the vinegar stock may be fed continuously and from which a predetermined volume of the vinegar stock is automatically fed into the generator by evenly spraying it over the whole of the filtering surface.

This apparatus is mounted on the bridge or support 1 which is placed diametrically on top of the generator 2. The support 1 is made up of the wide horizontally supported board 3 having the beams 4 and 5 placed edgewise at each side thereof. These beams are cut away at the bottom to a depth of about one inch practically the full length thereof except for a short distance at each end where the beams are supported on the horizontal board 3. The beams are held upright in this position by means of the cross beam 6 which is clamped down on top of the beams 4 and 5 with the clamping bolts 7 and 8 to prevent their tilting sideways on the board 3.

The moisture surrounding the generator during the generating process has a tendency to warp the board 3 so that it sometimes happens that the board will rest on the top edge of the generator on but three of the corners thereof. This makes the support formed by the board and beams unstable and the mechanism supported thereby is liable to get thrown out of alignment, impairing the operation of the mechanism in consequence thereof. This is remedied by tightening up on one or the other of the clamping bolts 7 and 8 to draw up the side of the board that has not warped and bring it in alignment with the side that has warped. In this way the board 3 forming the foundation of the support can be easily adjusted to overcome any unequality in the shape of it due to warping.

The feeding means proper consists of the container 9 suitably supported on top of the beams 3 and 4 by means of the cross bars 10 and 11. In this container is suspended the tipple 12 by means of the shaft 13. This shaft engages suitable pockets one on either side of the container 9 in which it can turn to swing the tipple as will hereinafter be described. The tipple is formed in the form of a scoop having two sides, a bottom and one end, the other end being omitted to allow the liquid to be discharged from the tipple at this point. The shaft 13 on which the tipple 12 is supported to swing in the container passes through the sides of the tipple and is suitably held in place therein.

The top of the container is closed by the flanged cover 14 the sides of which abut on the top of the sides of the container 9. In this top is provided the opening 15 through which the vinegar stock is fed from a suitable reservoir into the feeding mechanism. For this purpose a spigot 16 is provided on the end of the hose leading from the reservoir having its nozzle placed into the opening 15 to direct the stream of the vinegar stock directly into the tipple 12.

The tipple 12 is normally suspended by the shaft 13 at a slightly rearwardly inclined position so that the vinegar stock passing out of the spigot will readily accumulate therein. As the tipple is being filled with the vinegar stock this inclination of the tipple gradually increases until the rear end of the bottom of the tipple rests on the block 17 mounted in the bottom of the container 9 for the purpose of forming a suitable support for the tipple at a predetermined inclined position thereof. In order to make the tipple incline rearwardly as shown in the drawing the tipple is slightly overbalanced at the beginning at the closed end of the tipple and this is increased as the vinegar stock is fed into it until the rear end of the tipple rests on the block 17 as above pointed out.

Any additional liquid which is fed into the tipple after it rests on the block 17 with its rear end, begins to gradually fill the tipple to a point where the volume contained in the forward portion of the tipple gradually counterbalances and then overbalances the volume in the rearward portion of the tipple. The tipple will tip at the front end as soon as the weight of the volume of the liquid in the forward portion of the tipple overbalances the weight of the volume of the liquid in the rearward portion of the tipple. When this happens all of the liquid which has accumulated in the tipple is dumped into the container 9, in which the tipple is mounted to swing. The forward tilting of the tipple is arrested by a pair of suitable blocks 18 and 19 provided at the bottom of the container. Under the forward end of the tipple similar blocks are provided on the under side of the front end of the tipple, with which the blocks 18 and 19 make contact to arrest the forward tilting of the tipple on the dumping operation thereof.

From the container each batch of vinegar stock dumped into it by the tipple at regular intervals is sprayed over the filtering material forming the top layer in the vinegar generator, as will hereinafter be described. After each dumping operation, that is, as soon as the vinegar stock is drained from the tipple, it automatically returns to its normal position, due to the fact that the empty tipple is slightly overbalanced toward the rear end thereof, as heretofore pointed out, and when filled the tipple is overbalanced toward the front. A second batch is then ready to be run into the tipple and finally dumped into the container as above described. This cycle of operation repeats itself with unerring regularity as long as the stream of liquid vinegar stock continues to flow into the tipple from the vinegar stock reservoir.

In the opening 20 in the botton of the container 9 is mounted the nipple 21 which projects from the botton of the container and has the flexible rubber sleeve 22 suitably attached thereto. The rubber sleeve connects the nipple 21 leading from the bottom of the container 9 to the centering block 23 which is entered by the nipple 24, to which the rubber sleeve 22 is fastened. The block 23 is supported on the board 3 of the support and has the pipe 25 projecting downwardly therefrom thru a suitable opening therein.

The pipe 25 is thus suspended from the board 3 by the block 23 and is held centrally above the spraying cup 26.

The spraying cup 26 comprises a disc having an annular channel 27 having curved sides cut into the top thereof. In the center of the cup is formed the cone 28, the apex of which slightly projects above the outer edge of the circular channel. In the bottom of the spraying cup is provided a small pocket 29, into which the pin 30 is adapted to project for the purpose of centering the cup thereon and hold it in place at a predetermined point on the supporting beam 31. This supporting beam is suitably supported at diametrically opposite points on the inside of the vinegar generator 2 immediately above the top layer of filtering material.

The spraying cup 26 is held centrally of the generator by means of this supporting beam and the tube 25 is suspended centrally of the spraying cup from the block 23. The flexible rubber sleeve 22 is provided to allow the block 23 to be shifted on the board to center the tube 25 over the spraying cup without disturbing the setting of the feeding mechanism and the outlet therefrom.

The nipples 21 and 24 and the pipe 25 are preferably made of one inch hard rubber tubing although any other acid resisting material may be used for these tubes. This is also the case of the spraying cup 26 which is made of hard ruber, it being made of this material because it can be turned accurately into the desired shape that is essential for the correct spraying of the vinegar stock over the filtering material as will hereinafter appear.

When the vinegar stock is dumped into the container by means of the mechanism heretofore described the liquid will syphon out of the opening in the bottom of the container into the tube 25 without accumulating in the bottom of the container. The pipe 25 is large enough so that the liquid passing into it will quickly drain therefrom into the spraying cup 26.

The pressure with which the liquid drops onto the spraying cup, due to the height of the column of the liquid, forces the liquid down the curved sides of the cone 28 and up the curved sides of the circular channel, spreading the liquid over the surface of the filtering material by spraying it in a thin sheet concentrically to the spraying cup. The curvature of the outer wall of the annular channel 27 in the spraying cup is designed to deflect the liquid upwardly at an angle which will throw the liquid to the outer edge of the filtering material at the beginning of the spraying operation when the weight of the column of the liquid in the tube 25 is the greatest. As the liquid column diminishes in height, with a corresponding reduction in the pressure at which the liquid passes out of the bottom of the tube, the liquid is sprayed a gradually shorter distance in a way that will cover the whole of the surface of filtering material with an equal amount of vinegar stock by the time all of the liquid has passed out of the end of the tube and the pressure or force thereof has spent itself.

This happens every time the tipple dumps a quantity of vinegar stock into the container 9 and repeats itself with the same regularity as the dumping of the tipple itself.

From an inspection of the tipple as shown in the drawing it will be seen that the sides of the tipple are provided with a series of three holes. The shaft on which the tipple is supported may be passed thru any one of these holes, depending on the amount of liquid that is to be dumped by the tipple at one time. Thus if the shaft 13 is passed thru the hole nearest the closed end of the tipple, the tipple will dump with a smaller quantity of liquid contained therein and if the shaft is placed thru the holes nearest the open end of the tipple a larger quantity of liquid must be fed into it before it will overbalance and dump its contents. From this it will be seen that the vinegar stock may be fed into the vinegar generator in either smaller quantities at shorter intervals or larger quantities at longer intervals, depending on the time it takes to fill the tipple from the vinegar stock reservoir.

In vinegar generators generally the flow of the stock must be regulated so that it will pass thru the filter as fast as it reaches it so that there will not be any accumulation of the stock on top of the filtering material. It is well known that a vinegar generator always heats up and this is emphasized by the perforated distributing diaphragm or partition which has heretofore been used for distributing the stock on the filtering material. The small holes in this diaphragm are easily clogged up with the mother and they must be frequently cleaned out. With the use of my improved apparatus this diaphragm is dispensed with and better circulation of air is secured in the generator, reducing the heating effect in the generator. The apparatus also enables me to feed the liquid stock in smaller quantities at more frequent intervals, with perfect distribution of the stock over the whole filtering surface for each feed. Because of the absence of heating or the reduction in the tendency to heat the loss of vinegar by evaporation is greatly reduced, increasing the percentage of vinegar produced by the generator.

We claim:

1. The process of feeding vinegar stock into a vinegar generator which consists in feeding the stock into the generator and spraying it uniformly from the center of the generator with an increasing and decreasing pressure.

2. In a feeding mechanism for feeding vinegar stock the combination of a stationary container, a tripple mounted to rock in said container, said tipple being adapted to be continuously filled, and means adapted to hold said tipple in a predetermined position to allow the liquid running into the tipple to overbalance said tipple with a predetermined volume contained therein and automatically empty the contents thereof into said container, a stand pipe leading out of said container, a spraying device on the end of said stand pipe adapted to distribute the vinegar stock at a uniform rate over a large area.

3. In a feeding mechanism for feeding vinegar stock the combination of a stationary container, a tipple mounted to rock in said container, said tipple being adapted to automatically overbalance and discharge the contents thereof at predetermined intervals and with a predetermined volume of vinegar stock contained therein, a drain pipe leading from said container, spraying means on the end of said draining tube to distribute the vinegar stock uniformly over a large surface.

4. In a feeding mechanism for feeding vinegar stock the combination of a stationary container, a tipple mounted to rock in said container, said tipple being adapted to automatically overbalance and discharge its contents thereof at a predetermined period with a predetermined volume of vinegar stock contained therein, a stand pipe, a flexible connection between said stand pipe and said container to allow a lateral adjustment of the stand pipe below said container.

5. In a feeding mechanism for feeding vinegar stock the combination of a support comprising a horizontal base board, a pair of vertical and parallel beams supported on each side of said board, said beams being undercut at the bottom thereof, means to draw the sides of said board into the undercut portions of said beams, a container mounted on top of said beams, a tipple mounted to rock in said container, a hollow centering block supported on said base board, a stand pipe suspended from said centering block, a flexible connection between said centering block and said container, a spraying cup supported at the bottom of said stand pipe, said tipple being adapted to automatically discharge its contents at regular intervals with a predetermined volume of vinegar stock fed into it, said vinegar stock discharged by said tipple being uniformly sprayed over a large area by said spraying means at the bottom of said stand pipe.

6. In a feeding mechanism the combination of a spraying cup comprising a disc having an annular channel formed in the top thereof, curved walls on the outside and inside of said channel, said curved walls on the inside of said channel terminating in a cone, a tube suspended over said cone, said curved walls of said cone and said annular channel being adapted to divert and spray the liquid passing out of said tube into said cup over a large horizontal area and at an angle thereto.

7. In a feeding and spraying mechanism, the combination of a pipe, a spraying member supported at the end of said pipe with a space between said spraying member and the end of said pipe, said spraying member comprising a cone supported centrally of said spraying member and projecting into the end of said pipe, a channel surrounding the base of said cone, said channel having inclined outer walls to divert the vinegar stock flowing down the inclined sides of said cone upwardly and outwardly from the end of said pipe.

In testimony whereof we affix our signatures.

EDWARD G. PFAHL.
JULIUS A. PFAHL.